US006968782B2

(12) United States Patent
Cummings

(10) Patent No.: US 6,968,782 B2
(45) Date of Patent: Nov. 29, 2005

(54) PRINTING PLATE REGISTRATION AND IMAGING

(75) Inventor: Calvin Dane Cummings, Surrey (CA)

(73) Assignee: Creo Inc., Burnaby (CA)

( * ) Notice: Subject to any disclaimer, the term of this patent is extended or adjusted under 35 U.S.C. 154(b) by 342 days.

(21) Appl. No.: 10/356,574

(22) Filed: Feb. 3, 2003

(65) Prior Publication Data

US 2005/0115430 A1 Jun. 2, 2005

(51) Int. Cl.[7] .......................... H04N 1/08; B65H 9/18

(52) U.S. Cl. .................. 101/401.1; 101/485; 101/477; 347/262

(58) Field of Search .......................... 101/401.1, 481, 101/485, 463.1, 477, DIG. 36; 347/262, 347/264; 358/3.29, 3.32

(56) References Cited

U.S. PATENT DOCUMENTS

| | | | | |
|---|---|---|---|---|
| 6,016,752 | A * | 1/2000 | Harari | 101/486 |
| 6,755,132 | B1 * | 6/2004 | Cummings | 101/485 |
| 6,815,702 | B2 * | 11/2004 | Kiermeier et al. | 250/559.36 |
| 2004/0178570 | A1 * | 9/2004 | Blohdorn et al. | 271/265.01 |

* cited by examiner

*Primary Examiner*—Leslie J. Evanisko
(74) *Attorney, Agent, or Firm*—Oyen Wiggs Green & Mutala LLP

(57) ABSTRACT

A method and apparatus for applying an image to a printing plate while maintaining registration between the image and a reference edge of the printing plate include mounting the printing plate on a plate making machine and then determining the locations of two or more points on the reference edge. The locations of the two or more points are used to determine a transformation which is applied to image data to yield transformed image data. The transformed image data is used to image the printing plate.

25 Claims, 5 Drawing Sheets

PRINTING PLATE REGISTRATION AND IMAGING

TECHNICAL FIELD

The invention relates to printing and, in particular to providing registered images on printing plates.

BACKGROUND

Printing plates may be imaged on a plate making machine and then transferred to a printing press. Once on the printing press, the images from the printing plates are transferred to paper or other suitable substrates. It is important that images printed using a printing press be properly aligned with the substrate on which they are printed. Obtaining such alignment typically involves:

- carefully aligning a reference edge of a printing plate with pins or other features on the plate making machine;
- detecting one reference point on an orthogonal edge of the printing plate (i.e. orthogonal to the reference edge) at a known distance from the reference pins;
- imaging the printing plate; and,
- using the reference edge and the orthogonal edge reference point to align the printing plate on a drum of the printing press.

One common technique of aligning the printing plate on the drum of a printing press involves using the reference edge and the orthogonal edge reference point to align the printing plate on a punching machine and punching registration holes in the printing plate. The printing plate may then be aligned on the drum of the printing press with registration pins which project through the registration holes.

Printing plates are typically rectangular in shape. One of the long edges of the printing plate is typically used as a reference edge.

In the printing industry there is a general need for ways to improve the speed and accuracy with which printing plates can be prepared.

SUMMARY OF THE INVENTION

This invention provides a method for imaging a printing plate. The method comprises: mounting the printing plate on a surface of a plate making machine and subsequently determining locations of at least two points on the reference edge. Based on the locations of the at least two points on the reference edge, the method involves determining a transformation required to impart the image on the printing plate in a desired registration relative to the reference edge. The transformation may include a rotation. The method also involves applying the transformation to digital image data to yield transformed image data and using the transformed image data to image the printing plate.

The invention makes it unnecessary to accurately align the printing plate on the plate making machine prior to imaging the printing plate.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Prior Art

Figure 1:
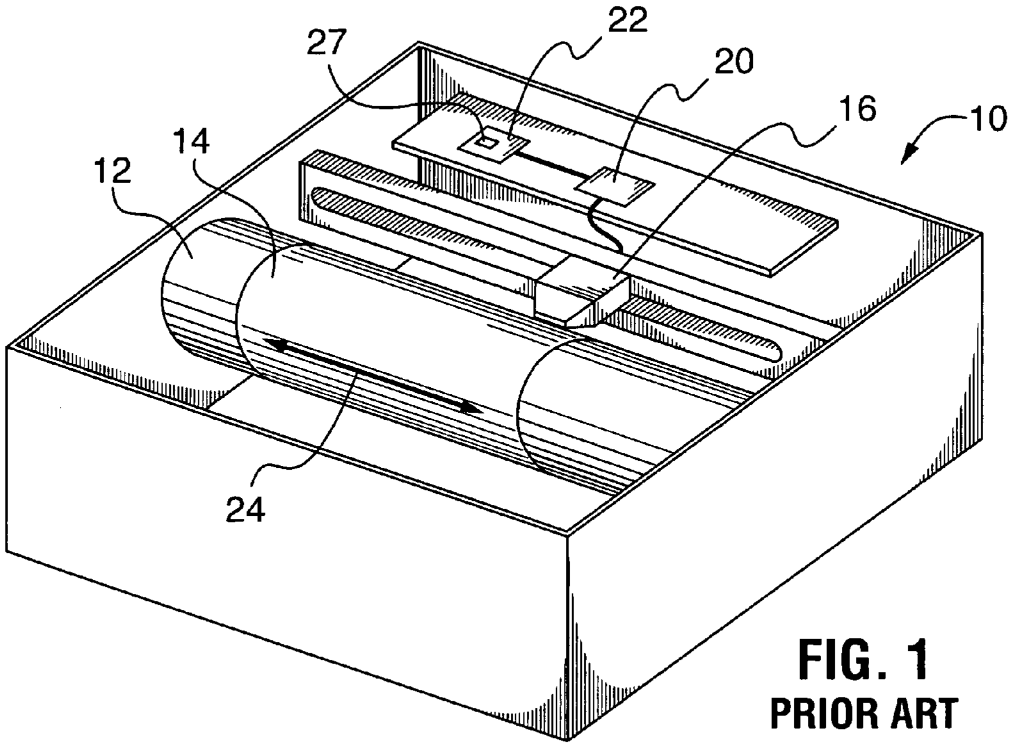
FIG. 1 PRIOR ART
FIG. 1 is a schematic diagram of a prior art external drum-type plate making machine.

FIG. 1 is a schematic depiction of a plate making machine 10 having a drum 12 on which a printing plate 14 may be mounted. Plate making machine 10 has an imaging head 16 which can impart an image onto printing plate 14. In the illustrated embodiment, imaging head 16 is axially movable relative to drum 12 (i.e. in the directions parallel to the axis of drum 12 indicated by double-headed arrow 24). Imaging head 16 typically includes a radiation source (not shown), such as a laser, which emits one or more beams of laser radiation capable of imparting an image onto printing plate 14. A controller 20 controls imaging head 16 and its associated radiation source in accordance with image data 27 stored in a memory 22, so as to image printing plate 14. The Trendsetter™ platesetters available from Creo Inc. of Burnaby, British Columbia, Canada represent examples of plate making machines having the basic configuration shown in FIG. 1.

Figure 2A:
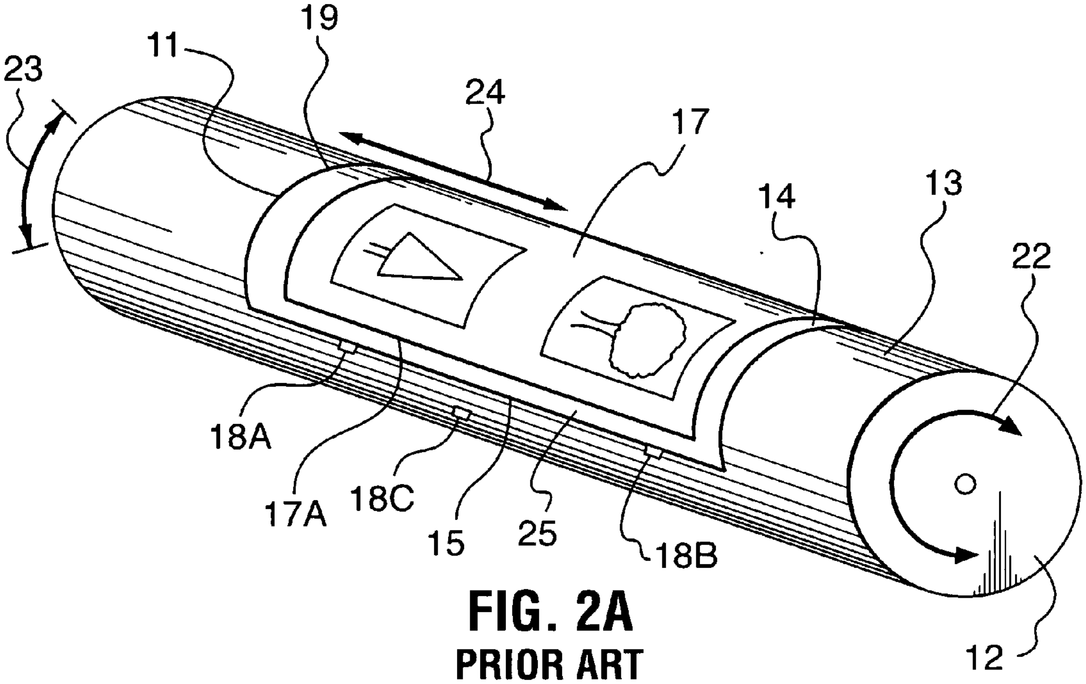
FIG. 2A PRIOR ART
FIG. 2A is an isometric depiction of a printing plate mounted to a drum in the plate making machine of FIG. 1.

FIG. 2A shows drum 12 of plate making machine 10 in greater detail. Drum 12 has a plurality of registration pins 18, which project from its cylindrical surface 13. In the illustrated embodiment, drum 12 comprises three registration pins 18A, 18B, 18C, which may be offset slightly from one another around the circumference of drum 12 to enable imaging of different sizes of printing plates. A reference edge 15 of plate 14 is brought into engagement with two registration pins 18A, 18B. Typically, plate 14 is rectangular in shape and reference edge 15 is one of the long edges of plate 14 (as depicted in FIG. 2A). The shorter, orthogonal edge 19 of plate 14 extends around the circumference of drum 12. An edge detector (not shown) detects the position of a third reference point 11 on orthogonal edge 19 of plate 14. Orthogonal edge reference point 11 is located at a fixed circumferential distance 23 relative to registration pins 18. Printing plate 14 is clamped onto drum 12 using any suitable clamping system (not shown). Typically, clamping systems clamp to reference edge 15 and to an opposing edge of plate 14 (not shown) that is parallel to reference edge 15.

With printing plate 14 clamped and registered, drum 12 is rotated about its axis in either or both of the directions indicated by arrow 22, while imaging head 16 is scanned axially along drum 12 (i.e. in the directions indicated by arrow 24). Controller 20 controls the relative movement of imaging head 16 and drum 12 and controls the radiation source in imaging head 16 in accordance with image data 27 to impart an image 17 onto printing plate 14. An edge 17A of image 17 is created substantially parallel to reference edge 15. The region 25 of plate 14 that is adjacent to reference edge 15 and the region (not shown) that is adjacent to the opposing edge of plate 14 are covered by the clamping system and are not imaged.

Figure 2B:
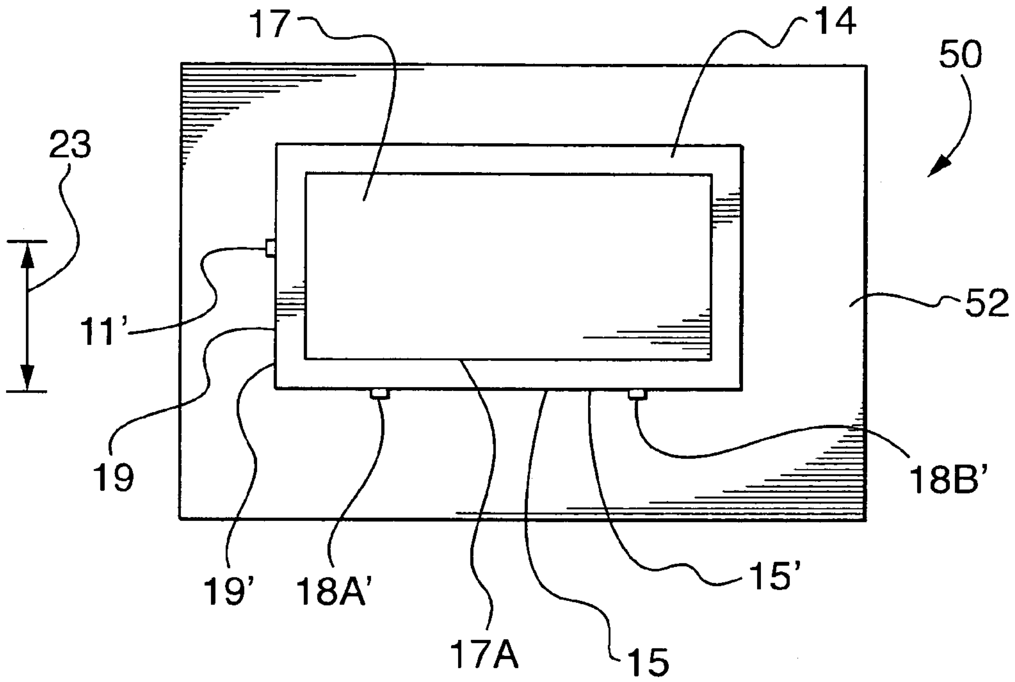
FIG. 2B is a top elevation view of an imaged printing plate in a punching machine.

After being imaged on plate making machine 10, plate 14 may be punched in a punching machine 50 as shown in FIG. 2B. Plate 14 is registered on punch table 52 of punching machine 50 by bringing it into engagement with two registration surfaces 18A', 18B' on its reference edge 15 and registration surface 11' on its orthogonal edge 19. The position and orientation of the two registration surfaces 18A', 18B' on punch table 52 (as measured with respect to each other and with respect to plate 14) may be substantially the same as the registration pins 18A and 18B on platemaking machine 10. Punch table 52 comprises a third registration surface 11' that is located a distance 23 from registration pins 18. Thus, registration surface 11' is located in the same position as orthogonal edge reference point 11 on plate making machine 10 (see FIG. 2A). With plate 14 registered to surfaces 18A', 18B', 11', punching machine 50 creates a number of punched features (not shown) in plate 14. The punched features created by punching machine 50 may have a wide variety of shapes, sizes and orientations. However, because the registration points are the same when plate 14 is imaged (18A, 18B, 11) and when it is punched (18A', 18B', 11'), the locations of the punched features are known precisely with respect to image 17.

Once plate 14 is punched, reference edge 15 and the opposing edge (i.e. parallel to reference edge 15) of plate 14 may be bent (not shown).

Figure 2C:
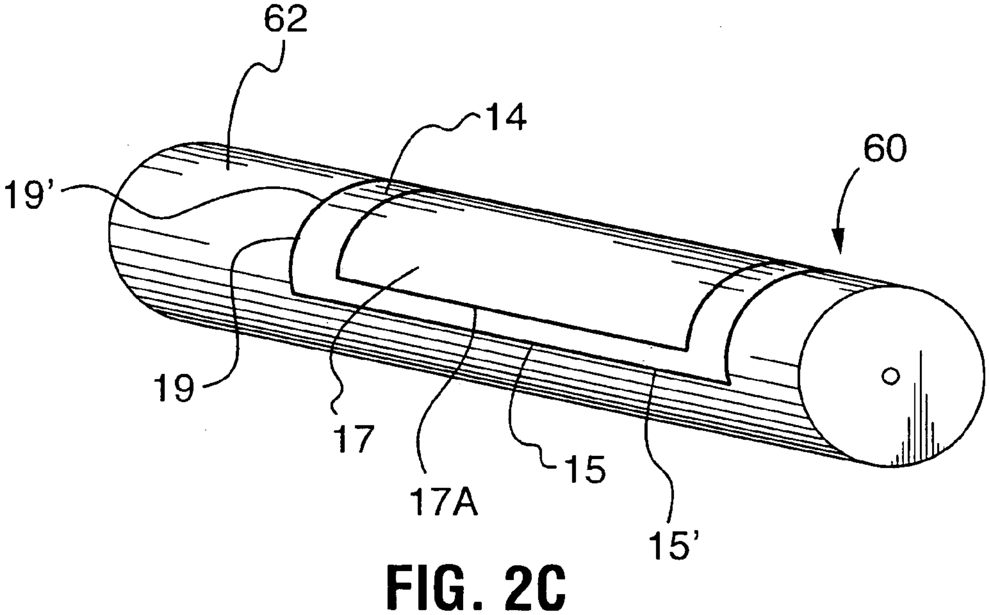
FIG. 2C is an isometric view of an imaged printing plate mounted on the drum of a printing press.

As shown in FIG. 2C, plate 14 is then mounted on a press cylinder 62 of a printing press 60. The clamping system (not shown) of printing press 60, which is used to mount plate 14 to press cylinder 62, may comprise registration pins (not shown) which project through the features punched in plate 14 to secure plate 14 to press cylinder 62. The clamping system may also use the bent edges of plate 14 (if present) to secure plate 14 to press cylinder 62. When plate 14 is securely mounted to press cylinder 62, the clamping system overlaps non-imaged region 25 of plate 14 (i.e. adjacent to reference edge 15) and the non-imaged region adjacent the opposing edge of plate 14 (i.e the edge parallel to reference edge 15). In this manner, the clamping system of printing press 60 does not impede image 17 on plate 14. Image 17 is then transferred to a substrate (not shown) by applying ink to plate 14 and rolling drum 62 to bring inked image 17 into contact with the substrate.

The Present Invention

Figure 3:
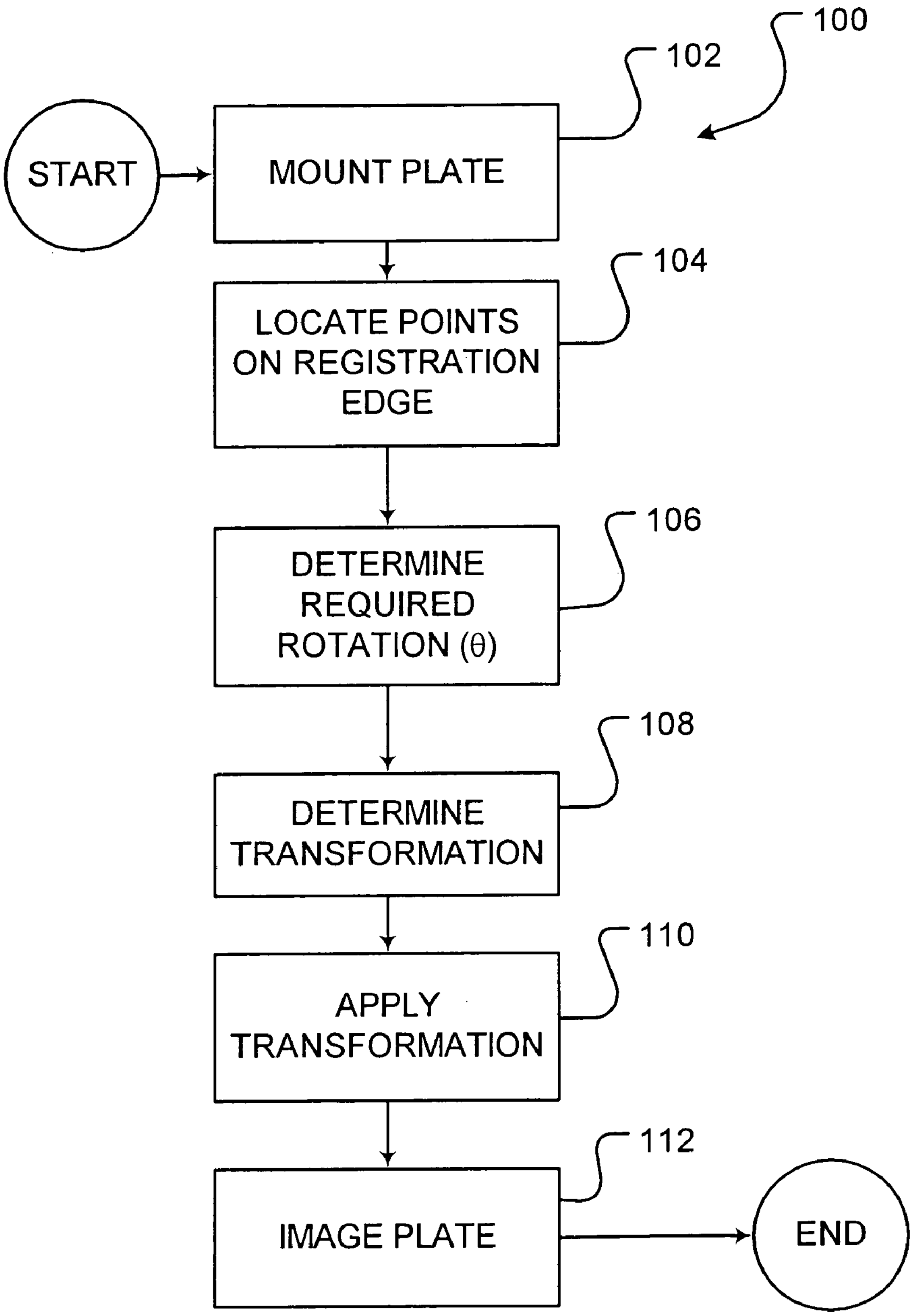
FIG. 3 is flow chart illustrating one embodiment of a method for imaging a printing plate according to the invention.
Figure 4:
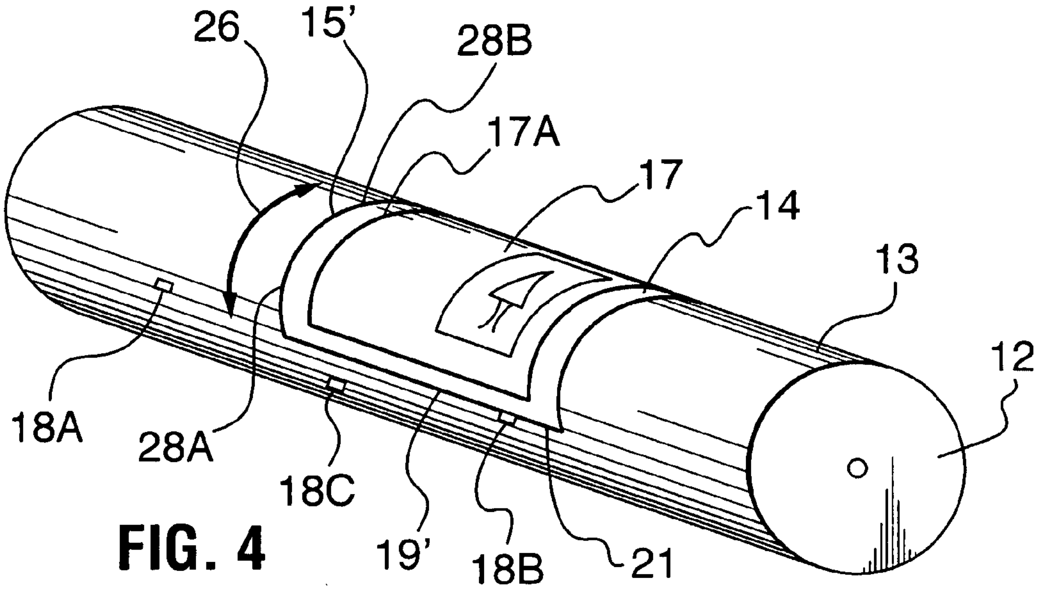
FIG. 4 is an isometric depiction of a printing plate mounted to a drum of a plate making machine according to a particular embodiment of the invention.

FIG. 3 shows a method 100 for registering and imparting image 17 onto printing plate 14. FIG. 4 depicts printing plate 14 on drum 12 of a plate making machine according the present invention. Method 100 begins with block 102, which involves mounting printing plate 14 on drum 12 of a plate making machine. The plate making machine could be an external drum-type plate making machine 10, as shown in FIG. 1. Alternatively, the plate making machine could be a flat bed-type plate making machine or an internal drum-type plate making machine.

In the illustrated embodiment of the invention (FIG. 4), printing plate 14 is mounted to a drum 12 of an external drum-type plate making machine with its reference edge 15' (i.e. the longer edge of plate 14) extending, at least partially, in a circumferential direction 26 around drum 12. The shorter, orthogonal edge 19' of plate 14 touches at least one of reference pins 18A, 18B, 18C on drum 12 to provide a single orthogonal edge reference point 21.

A suitable clamping system (not shown) holds printing plate 14 on drum 12 of the plate making machine in a manner that leaves at least a portion of its reference edge 15' exposed. The clamping system may attach itself to orthogonal edge 19' and the opposing edge (i.e. parallel to orthogonal edge 19') of plate 14, leaving a majority of reference edge 15' exposed.

In block 104, the positions of at least two reference points 28A, 28B on reference edge 15' are determined. Reference points 28A, 28B may be found using a suitable edge finder. Various types of known edge finders exist and may be used to locate the two or more edge points in block 104. For example, a point on reference edge 15' could be located using an optical reflection-type edge finder, a mechanical probe, a capacitative edge finder, a camera coupled with an image processor executing edge-finding software or the like.

In block 106, the locations of the at least two reference points reference 28A, 28B are used to determine an angle 0 by which image 17 should be rotated to properly align an edge 17A of image 17 with reference edge 15' of printing plate 14. In block 108, the rotation angle θ determined in block 106 is used to generate a transformation to be applied to image data 27. The transformation may combine rotation and translation to map each image point in the image data 27 to a transformed image point.

The transformation is applied to image data 27 in block 110 to produce transformed image data. The transformation may be determined (in block 108) and applied to image data 27 (in block 110) by a data processor at the plate making machine. For example, a processor in controller 20 may determine the transformation from data provided by the edge finder and apply the transformation to image data 27.

In block 112, the transformed image data is used by controller 20 to drive imaging head 16 and its associated radiation source, so that image 17 is imparted on plate 14. As discussed above, imaging head 16 moves in the axial directions (see arrow 24 of FIG. 1) to impart image 17 onto plate 14. In accordance with the invention, when plate 14 is oriented on drum 12 with its longer, reference edge 15' extending (at least partially) in circumferential direction 26 and its shorter, orthogonal edge 19' extending (at least partially) parallel to the axis of drum 12, image 17 may be imparted on plate 14 significantly more quickly than in prior art embodiments, because plate 14 can be completely imaged while moving imaging head 16 through a reduced range of travel in the axial direction.

Image 17 imparted onto plate 14 will have an edge 17A that is aligned with reference edge 15' of plate 14. In some embodiments, image 17 imparted onto plate 14 may have some other desired registration relative to reference edge 15'.

After plate 14 is imaged, it may be punched on a punching machine 50 (see FIG. 2B). Registration surfaces 18A', 18B' of punching machine 50 are aligned with edge detected reference points 28A, 28B on reference edge 15' of plate 14. Similarly, registration surface 11' of punching machine 50 is aligned with orthogonal edge reference point 21. Because of the registration of reference points 21, 28A, 28B to registration surfaces 11', 18A', 18B', when plate 14 is punched, the locations of the punched features are known precisely with respect to image 17. If required, reference edge 15' and the opposing edge (i.e. parallel to reference edge 15') of plate 14 may be bent (not shown).

Plate 14 may then be mounted onto press cylinder 62 of a printing press 60 (see FIG. 2C). When plate 14 is mounted on the drum of a printing press, it is preferably mounted such that its reference edge 15' extends in an axial direction (i.e. parallel to the axis of the drum). The clamping system of printing press 60 may comprise registration pins which project through the punched features in plate 14 to secure plate 14 to press cylinder 62. The clamping system of press 60 may also use the bent edges of plate 14 to secure it to press cylinder 62. Once mounted to press cylinder 62, image 17 can be inked and transferred to paper and/or other suitable substrates.

Figure 5:
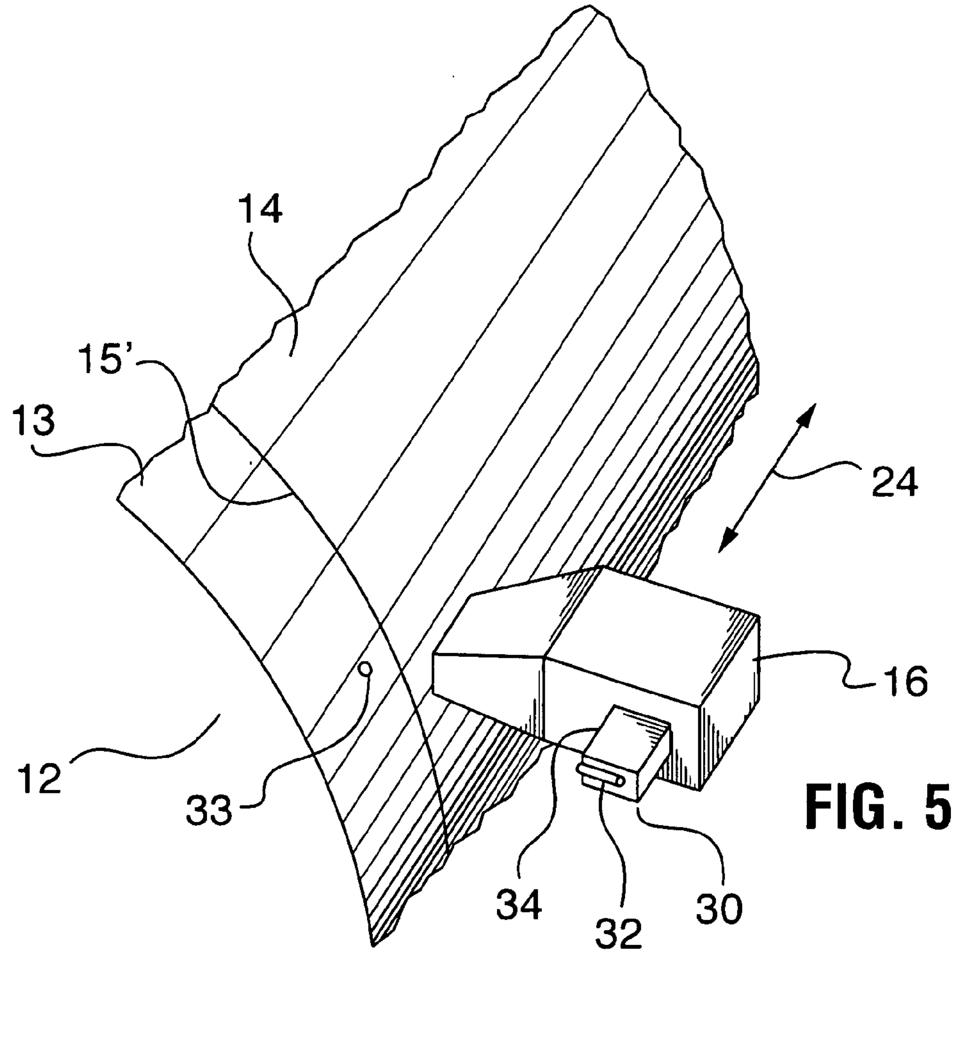
FIG. 5 is a schematic illustration of a plate making machine according to one embodiment of the invention which comprises a reflection-type edge finder.

FIG. 5 illustrates the operation of a reflection-type edge finder 30 that is mounted on imaging head 16. Edge finder 30 relies upon differences in the reflective properties of printing plate 14 and the cylindrical surface 13 of drum 12. In the illustrated embodiment, edge finder 30 comprises: (i) a radiation source 32 which generates a spot 33 of radiation directed at surface 13; and (ii) a radiation detector 34 which detects radiation reflected from spot 33. Radiation source 32 and radiation detector 34 are both mounted to move with imaging head 16. Imaging head 16 is scanned axially (i.e. in the directions indicated by arrow 24), so that spot 33 crosses reference edge 15'. When spot 33 crosses reference edge 15', radiation detector 34 detects a change in the radiation reflected from spot 33. In this embodiment of the invention, the location of a reference point 28A, 28B on reference edge 15' may be determined from the position of imaging head 16, when the change in radiation reflected from spot 33 is detected. Additional reference points on reference edge 15 may be detected by rotating drum 12 in either or both of directions 22 and repeating the above procedure.

Figure 6:
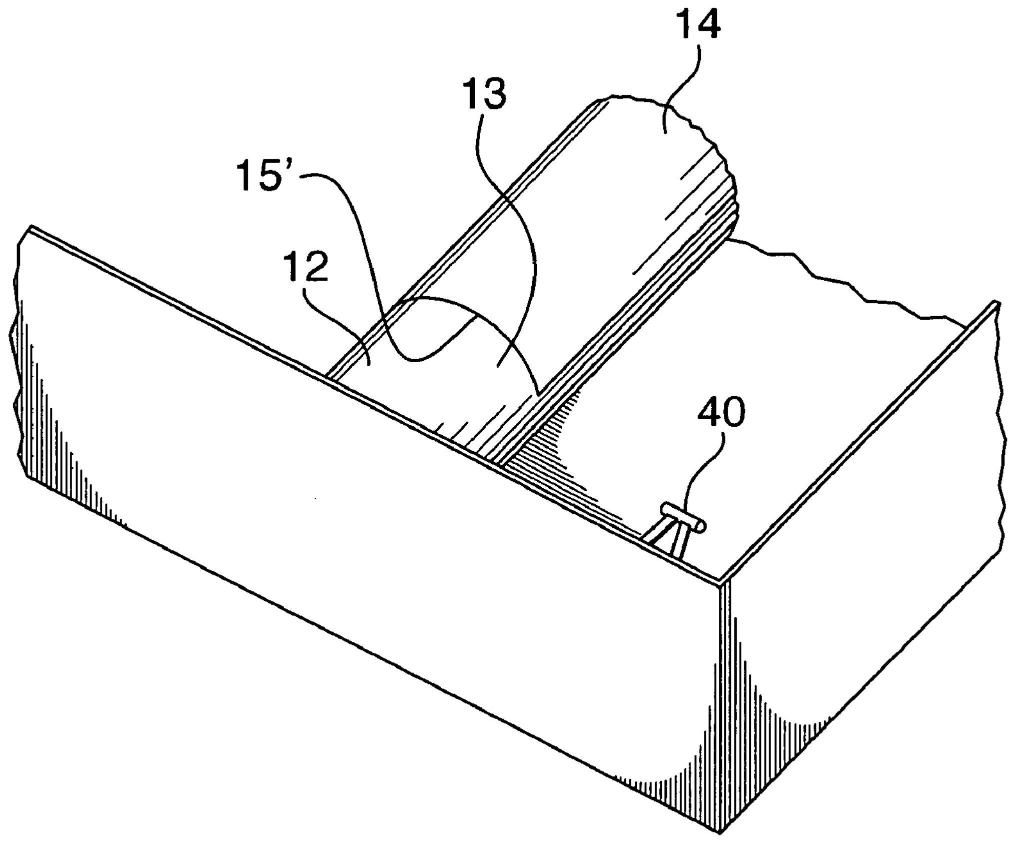
FIG. 6 is a schematic illustration of a plate making machine according to one embodiment of the invention which comprises a camera-type edge finder.

In the embodiment of FIG. 6, a digital camera 40 which has a known position and orientation relative to drum 12 captures an image of reference edge 15'. The image is processed to identify reference edge 15' and to determine the locations of two or more reference points 28A, 28B on reference edge 15'. A line detection algorithm may be used to locate reference edge 15'. A straight line may be fitted to the located reference edge 15'. The positions of the two or more reference points 28A, 28B on reference edge 15' may be determined from the fitted line.

Alternatively or additionally, edge finder 30 may comprise a mechanical probe tip which detects reference edge 15' by contact, or a capacitive sensor which detects a change in the electrical capacitance between the sensor and drum 12 as the capacitive sensor is scanned along a trajectory that crosses reference edge 15'.

Certain implementations of the invention comprise computer processors which execute software instructions that cause the processors to perform a method of the invention. For example, one or more data processors in controller 20 may implement method 100 of FIG. 3 by executing software instructions in a program memory accessible to the processors. The invention may also be provided in the form of a program product. The program product may comprise any medium which carries a set of computer-readable signals comprising instructions which, when executed by a computer processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links.

Where a component (e.g. a software module, processor, assembly, device, circuit, etc.) is referred to above, unless otherwise indicated, reference to that component (including a reference to a "means") should be interpreted as including, as equivalents of that component, any component which performs the function of the described component (i.e., that is functionally equivalent). Such equivalents should include components which are not structurally equivalent to the disclosed structure, but which perform the function in the illustrated exemplary embodiments of the invention.

As will be apparent to those skilled in the art in the light of the foregoing disclosure, many alterations and modifications are possible in the practice of this invention without departing from the spirit or scope thereof. For example,

- The present invention may generally employ any method and/or apparatus to detect the positions of two or more points on reference edge 15' and should be considered to include all edge-finding techniques.
- The present invention may generally employ any apparatus and/or method of clamping plate 14, to the surface of drum 12 of the plate making machine, so long as at least a portion of reference edge 15' is exposed. Accordingly, the invention should be considered independent of the particular clamping technique employed.
- Because plate 14 is oriented on drum 12 of the plate making machine with its longer, reference edge 15' extending (at least partially) circumferentially around drum 12 and its shorter, orthogonal edge 19' extending (at least partially) parallel to the axis of drum 12, there may be non-imaged regions (not shown) adjacent to orthogonal edge 19' and adjacent to the edge opposing orthogonal edge 19', where the clamping system of the plate making machine secures plate 14 to drum 12 during imaging. Such non-imaged regions may be exposed and/or treated prior to printing, so that ink does not adhere to these non-imaged regions during printing. This exposure and/or treatment conserves ink.

Accordingly, the scope of the invention is to be construed in accordance with the substance defined by the following claims.

What is claimed is:

1. A method of imaging a substantially rectangular printing plate, having a pair of shorter edges shorter than the longer edges the method comprising:

- mounting the printing plate on an imaging drum in an orientation wherein a one of the longer edges of the printing plate serves as a reference edge extends around the drum in a substantially circumferential direction;
- determining locations of at least two circumferentially spaced apart points on the reference edge;
- transforming digital image data representing an image to be imparted on the printing plate to yield transformed digital image data; and,
- imparting an image on the printing plate using the transformed digital image data, the imparted image aligned with the reference edge.

2. A method as in claim 1 comprising punching one or more registration features in the printing plate using a punching machine while holding the reference edge in contact with two or more reference surfaces of the punching machine in a position where one of the points on the reference edge is aligned with each of the reference surfaces; wherein imparting the image on the printing plate comprises operating an imaging head that is movable in an axial direction relative to the drum and imparting the image on the printing plate is completed while the imaging head is within a range of travel in the axial direction that is reduced relative to a length of the printing plate along the reference edge.

3. A method as in claim 1, wherein determining locations of at least two circumferentially spaced apart points on the reference edge comprises, for each of the points:

directing a beam of radiation towards a surface of the drum;

moving the beam across the reference edge to generate a transition in a reflected beam; and determining the location of the point by detecting the transition in the reflected beam.

4. A method as in claim 3, wherein detecting the transition in the reflected beam comprises detecting a change in intensity of the reflected beam.

5. A method as in claim 3, wherein detecting the transition in the reflected beam comprises detecting a shift in position of the reflected beam.

6. A method as in claim 3, wherein the drum is mounted in a plate making machine the imaging head is on a moveable carriage and the beam of radiation originates from a source located on the moveable carriage.

7. A method as in claim 1, wherein determining locations of the circumferentially spaced apart points on the reference edge comprises obtaining a digital image of a region including at least a part of the reference edge and locating the reference edge in the digital image.

8. A method as in claim 7, wherein locating the reference edge in the digital image comprises performing a line detection algorithm.

9. A method as in claim 1, wherein transforming digital image data is performed in a data processor associated with a plate making machine which houses the drum.

10. A method according to claim 1 wherein imparting the image leaves non-imaged regions of the printing plate extending along one or both of the shorter edges of the printing plate and the method comprises exposing or treating the non-imaged regions of the printing plate before printing with the printing plate.

11. A method according to claim 1 comprising mounting the printing plate on a press cylinder of a printing press with the reference edge aligned substantially parallel to an axis of rotation of the press cylinder.

12. A method according to claim 1 comprising at least one of punching and bending the printing plate along the reference edge to facilitate attachment of the reference edge to a press cylinder of a printing press.

13. A method of imaging a substantially rectangular printing plate having a pair of longer edges and a pair of shorter edges shorter than the longer edges, the method comprising:

mounting the printing plate on a substantially cylindrical drum, with one of the longer edges serving a reference edge of the printing plate extending in a substantially circumferential direction on the drum;

determining locations, in an axial direction parallel to an axis of the drum, of at least two points on the reference edge;

based on the locations of the at least two points on the reference edge, determining a transformation required to impart an image on the printing plate in a desired registration relative to the reference edge;

applying the transformation to digital image data to yield transformed image data; and, imaging the printing plate using the transformed image data; wherein imaging the plate comprises operating an imaging head that is movable axially relative to the drum and wherein imaging the printing plate is completed while the imaging head is within an axial range of travel that is reduced relative to the length of the reference edge.

14. A method as in claim 13 comprising punching one or more registration features in the printing plate using a punching machine while holding the reference edge in contact with two or more reference surfaces of the punching machine in a position where one of the points on the reference edge is aligned with each of the reference surfaces.

15. A method as in claim 13, wherein determining locations of at least two points on the reference edge comprises, for each of the points:

directing a beam of radiation towards a surface of the drum;

moving the beam across the reference edge to generate a transition in a reflected beam; and determining the location of the point by detecting the transition in the reflected beam.

16. A method as in claim 15, wherein detecting the transition in the reflected beam comprises detecting a change in intensity of the reflected beam.

17. A method as in claim 15, wherein detecting the transition in the reflected beam comprises detecting a shift in position of the reflected beam.

18. A method as in claim 15, wherein the drum is mounted in a plate making machine, the imaging head is on a moveable carriage and the beam of radiation originates from a source located on the moveable carriage.

19. A method as in claim 13, wherein determining locations of at least two points on the reference edge comprises obtaining a digital image of a region including at least a part of the reference edge and locating the reference edge of the plate in the digital image.

20. A method as in claim 19, wherein locating the reference edge of the plate in the digital image comprises performing a line detection algorithm.

21. A method as in claim 13, wherein determining the transformation is performed in a data processor which is a part of a plate making machine that houses the drum.

22. A method according to claim 13 comprising mounting the printing plate on a press cylinder of a printing press with the reference edge aligned substantially parallel to an axis of rotation of the press cylinder.

23. A method according to claim 13 comprising at least one of punching and bending the printing plate along the reference edge to facilitate attachment of the reference edge to a press cylinder of a printing press.

24. A plate making apparatus comprising:

a substantially cylindrical imaging drum comprising means for securing a printing plate in an orientation wherein a longer edge of the plate extends around the drum in a substantially circumferential direction;

edge detecting means for determining locations, in a direction aligned with an axis of the drum, of at least two circumferentially spaced apart points on the longer edge;

a processor configured to transform digital image data representing an image to be imparted on the plate into transformed digital image data based on the locations of the at least two circumferentially spaced apart points, the transformed digital image data comprising an image that is aligned with the longer edge of the plate; and, an imaging head connected to receive the transformed digital image data from the processor and to impart the image onto the printing plate based on the transformed image data while the imaging head is within a range of travel in an axial direction that is reduced relative to a length of the reference edge.

25. A plate making apparatus according to claim 24 comprising a punching machine having reference surfaces alignable with reference points on the reference edge of the printing plate, the punching machine operable to punch features in the printing plate.

* * * * *